Dec. 2, 1969  J. R. SCHNEIDER ET AL  3,482,184
LASER DEVICE HAVING MULTIPLE CAVITIES THAT SHARE A COMMON
ACTIVE LASING MATERIAL
Filed July 19, 1965

INVENTORS
JOSEPH R. SCHNEIDER
JAMES K. SHARP
EO VAHER
BY
John H. Gallagher
ATTORNEY

# United States Patent Office 3,482,184
Patented Dec. 2, 1969

3,482,184
LASER DEVICE HAVING MULTIPLE CAVITIES THAT SHARE A COMMON ACTIVE LASING MATERIAL
Joseph R. Schneider, Larchmont, James K. Sharp, Huntington, and Eo Vaher, Huntington Station, N.Y., assignors to Sperry Rand Corporation, Great Neck, N.Y., a corporation of Delaware
Filed July 19, 1965, Ser. No. 472,777
Int. Cl. H01s 3/02
U.S. Cl. 331—94.5        5 Claims

ABSTRACT OF THE DISCLOSURE

A laser apparatus comprising two optical cavities arranged in a manner to have a common portion wherein an active lasing medium is positioned to operate in conjunction with a beam-splitter to establish cross-polarized laser oscillations in the respective cavities, the spatially separated regions of the cavities being independently adjustable for controlling the amplitude and frequency of the light waves propagating therein.

---

Figure 1:
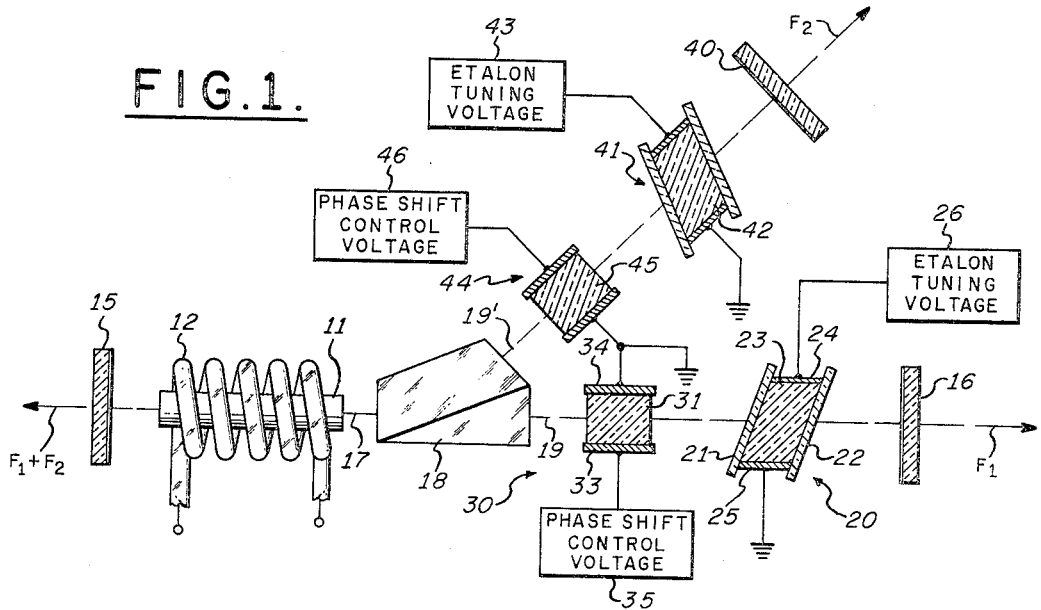

The invention herein described was made in the course of or under a contract or subcontract thereunder, with the Department of the Air Force.

This invention relates to a laser device that has a plurality of optical cavities all of which share one common portion in which is located an active lasing material. Each of the plurality of optical cavities may be separately tuned to support lasing action at different frequencies that fall within the lasing capabilities of the one active lasing material.

In laboratory measurement and analysis work it sometimes is desirable to have two light beams that are substantially independent in their amplitudes and/or frequencies yet are relatively stable relative to each other. For example, in studying the properties of transparent solid, liquid and gaseous materials, including gas plasmas, it may be desirable to determine what effect the material being studied will have upon the characteristics of a light beam. The manner in which the light beam is affected in passing through the material under investigation may be determined by comparing it against a reference light beam whose amplitude and/or frequency are accurately known. In such situations it is necessary that extraneous effects such as vibration, thermal effects, and air currents do not differentially affect the characteristics of the beams since this will lead to inaccuracies in the investigations being conducted. It therefore would be desired that if any of these deleterious conditions are present that they affect both light beams in like manner so that when the two beams are compared the undesired effects would be nullified. In the event that the two different light beams are laser beams it would be desirable that both of them emanate from the same active material in order that the beams be relatively stable with respect to each other. On the other hand it also is desirable that the frequency and amplitude characteristics of one of the beams be capable of being controlled in a known manner completely independently of the other beam.

It therefore is an object of this invention to provide means for producing two separate laser beams that emanate from the same active lasing material but whose characteristics of amplitude, frequency, or polarization are independently controllable.

It is a further object of this invention to provide a lasing device comprised of a plurality of optical cavities which are independently tunable and which share a common active lasing material.

In accordance with the present invention a lasing device is provided in which three reflective end mirrors are arranged so as to establish two separate optical cavities, one of the cavities being provided between a first and second mirror and the second cavity being established between the first and third mirror, wherein the third mirror is angularly displaced with respect to the second mirror. Means are provided for splitting a beam of light that emanates from an active lasing material adjacent the first mirror so that the split paths will cause respective beams of light to be incident on both the second and third mirrors. That is, the two light cavities have the configuration of the letter Y, wherein the active lasing material is located in the base portion of the Y and a beam splitter is employed to establish the outwardly extending arms of the Y. Light beams propagate independently between the respective arms and the common base portion of the Y, and means may be provided in the respective arms for independently controlling the characteristics of each of the beams.

Figure 2:
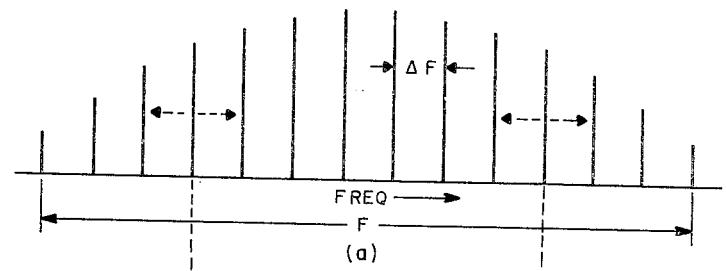
Figure 2:
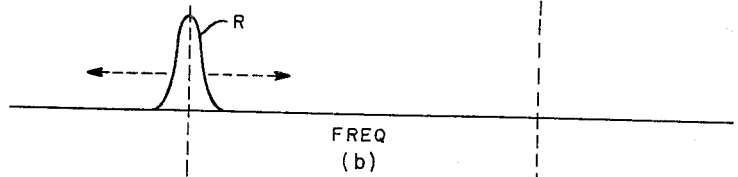
Figure 2:
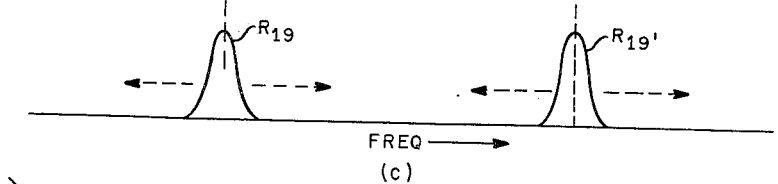

The invention will be described by referring to the accompanying drawings in which:

FIG. 1 is a simplified block diagram of the Y-shaped multi-cavity laser of the present invention; and FIG. 2 is a simplified illustration of the frequency characteristics of the apparatus illustrated in FIG. 1 and will be used in explaining the operation of the multi-cavity laser of FIG. 1.

Referring now in detail to FIG. 1, a rod 11 of an active lasing material such as ruby is surrounded by a photoflash tube 12 which emits light having a frequency component sufficient to "pump" the rod 11 of active lasing material into an excited state so that it is stimulated to produce coherent oscillations of light, as is well understood in the art. Highly reflective end mirrors 15 and 16 define an optical cavity in which the rod 11 of active lasing material is located. The rod 11 of active lasing material emits a beam 17 of coherent light that contains both horizontal and vertical plane polarized components. It is known that many types of lasers produce coherent light that is plane polarized in orthogonal planes. In addition to the above-mentioned ruby laser, neodymium doped glass will produce this type of light emission.

A beam splitter 18 is disposed in the path of light beam 17 and functions to separate beam 17 into two independent light paths 19 and 19'. The beam splitter 18 preferably is a Glan-Thompson prism that is well known in the art and which functions to reflect along the light path 19' only horizontally polarized light that is emitted by rod 11 of active lasing material. The vertically polarized light that is emitted by the active lasing material passes directly through beam splitter 18 and proceeds along the light path 19.

A Fabry-Perot interferometer, or etalon, 20 is positioned along light path 19 and adjacent end mirror 16. Etalon 20 is comprised of the tilted end mirrors 21 and 22 each of which has a reflectivity that is high but yet lower than the reflectivities of the end mirrors 15 and 16 of the laser optical cavity. The inclined mirrors 21 and 22 function as a mode selector etalon to restrict the frequency output of the lasing active material 11, as is taught in copending patent application Ser. No. 267,591 now U.S. Patent No. 3,358,243, filed Mar. 25, 1963 in the names of S. A. Collins, Jr. and G. R. White, and assigned to applicants' assignee. Briefly stated, etalon 20 functions as a frequency selector in the following manner. As illustrated in FIG. 2a, the frequency spectrum of the coherent light from rod 11, in the absence of etalon 20, would be comprised of a plurality of discrete frequency components that extend throughout the frequency range F that is defined as the linewidth of the material. The discrete frequency components within the linewidth F are separated by the frequency interval ΔF which is known as the spectral-free range. Because the mirrors 21 and 22 of etalon 20 are close together, its frequency response will be restricted to one, or possibly several, resonant frequencies that fall within the linewidth F of the laser cavity. The frequency response characteristics of etalon 20 is represented by the resonance curve R in FIG. 2b. Therefore, the etalon rejects those frequencies whose wavelengths are not an integral number of half wavelengths for the optical distance between the end mirrors of etalon 20. Consequently, the laser will lase and emit light only at frequencies passed by etalon 20.

Disposed between the mirrors 21 and 22 of etalon 20 is a crystal of electro-optic material 23 which is capable of presenting to the light waves an index of refraction which varies as a function of the electric field applied between the electrodes 24 and 25, the electric field being established by the etalon tuning voltage source 26. The frequency response of etalon 20, and thus the position along the frequency axis of its resonance curve R in FIG. 2b, may be varied by changing the index of refraction of the electro-optic material 23. The resonant frequency of etalon 20 also may be varied by physically changing the separation between the etalon mirrors 21 and 22. This may be done either mechanically or electromechanically.

Also disposed along the light path 19 is an electro-optic phase shifter 30 which is comprised of an electro-optic material 31 which has the conductive electrodes 33 and 34 on opposite faces thereof. A phase shift control voltage from source 35 is applied to the electrodes 33 and 34 to control the index of refraction of the electro-optic material 31. A change in the index of refraction of electro-optic material 31 causes the light waves propagating along path 19 to experience a different phase shift in propagating through the material, thereby changing the electrical length of the optical cavity defined by the laser end mirrors 15 and 16. This has the effect of causing the spectral lines of FIG. 2a to shift in position along the frequency axis and also causes the spectral-free range ΔF to change slightly.

The electro-optic materials 23 and 31 which are capable of presenting different indices of refraction to the light waves in response to the respective biasing voltages may be any of the well known electro-optic crystals such as the dihydrogen phosphates of ammonium or potassium which commonly are referred to as ADP and KDP, or alternatively, the material might be potassium tantalum niobate which commonly is referred to as KTN. Other suitable materials in the solid, liquid or gaseous states may be used for the electro-optic material if desired.

The path 19' which forms the second arm of the Y-configuration includes a highly reflective laser cavity end mirror 40, and an inclined etalon 41 within which is disposed the electro-optic material 42 whose index of refraction is controlled by the etalon tuning voltage source 43. Also included along light path 19' is a second electro-optic phase shifter 44 which is comprised of electro-optic material 45 whose index of refraction is variable in response to the phase shift control voltage from source 46. Etalon 41 and phase shifter 44 may be substantially identical to the etalon 20 and phase shifter 30 in the other arm of the Y-configuration. End mirror 15, rod 11, beam splitter 18, phase shifter 44, etalon 41, and end mirror 40 define a second laser cavity whose frequency of operation will be determined by the parameters of the components of that cavity.

In the operation of the apparatus illustrated in FIG. 1, the active lasing material of rod 11 emits the beam 17 of coherent light that contains components that are both horizontally plane polarized and vertically plane polarized. These components enter beam splitter 18 and, in accordance with the operation of the Glan-Thompson prism, the vertically polarized components propagate directly through the prism and emerge along the path 19, then pass through the phase shifter 30 and etalon 20 and are reflected from the laser cavity end mirror 16. The reflected waves then pass from right to left through the named components and are reflected from the cavity end mirror 15. Because of the limited frequency response characteristic of etalon 20, which is represented by the resonance curve $R_{19}$ in FIG. 2c, the laser cavity defined by end mirrors 15 and 16 will contain the vertically polarized coherent light having the narrow frequency spectrum defined by the resonance curve $R_{19}$. The horizontally polarized light that is reflected along the path 19' by beam splitter 18 passes through the phase shifter 44 and etalon 41 and is reflected from the second laser cavity end mirror 40, and then is redirected back through etalon 41 and phase shifter 44 and is reflected by beam splitter 18 onto the path 17 to the common laser cavity end mirror 15. The coherent light that propagates between the second laser cavity end mirrors 15 and 40 therefore is horizontally plane polarized light whose frequency is determined by the frequency response curve of etalon 41 which is illustrated by the resonance curve $R_{19'}$ in FIG. 2c. Because both resonance curves $R_{19}$ and $R_{19'}$ are within the linewidth F of the active lasing material of rod 11 the material will lase at both frequencies and with the respective orthogonal polarizations. It thus is evident that the end mirrors 15 and 16 comprise a first laser cavity and the end mirrors 15 and 40 comprise a second laser cavity, the two cavities sharing the same active lasing material of rod 11. Consequently, any temperature changes, vibrations, or air currents that affect the functioning of the active lasing material of rod 11 will cause similar effects to occur in both of the laser beams since the active material is common to the two cavities.

The two laser cavities are separately and independently tunable, however, despite the fact that they share the common active lasing material. Assuming that it is desired to change the frequency of the light in the second laser cavity that includes end mirrors 15 and 40, the phase shift control voltage from source 46 will be changed to alter the index of refraction of the electro-optic material 45 of phase shifter 44. This has the effect of shifting the spectral lines of FIG. 2a along the frequency axis. Because the spectral lines in the emission of the active lasing material are separated by the spectral-free range ΔF, the resonance curve $R_{19'}$ of etalon 41 may not now be coincident with the spectral line of the second laser cavity. To achieve coincidence of these lines, or tracking, the etalon tuning voltage from source 43 may be changed to alter the index of refraction of electro-optic material 42 so that the resonance curve $R_{19'}$ of FIG. 2c is shifted along the frequency axis to coincide with the displaced spectral line of FIG. 2a, thereby assuring optimum light emission in the second laser cavity. The first laser cavity defined by end mirrors 15 and 16 may be tuned in a similar manner. Because of the Y-configuration, as formed by the use of the beam splitter 18, it is possible to achieve this completely independent control of the two cavities and yet maintain the advantage of having the active lasing material common to both of them.

The vertically polarized light may be taken separately from the first laser cavity through the end mirror 16, as is common in laser devices, and the horizontally polarized light may be taken separately from the second laser cavity through end mirror 40. In the event that the orthogonally polarized light that is generated in the cavities is desired to be coupled out along the same path, the output may be taken through the common end mirror 15.

It thus may be seen that by applying the Y-configuration as above described, the lasing device maintains the attributes of having the active lasing material common to both cavities and yet independent control of the frequency of each cavity is possible. It will be appreciated that other control means such as attenuators may be provided in the separate arms of the Y-configuration to independently control the amplitude of the respective beams of the two cavities.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus for producing from a common active lasing source a plurality of light beams having different characteristics, comprising
   an active lasing medium for producing light that has at least two components that are differently polarized,
   a reflecting end mirror disposed at one end of said active lasing medium,
   means disposed at the opposite end of said active lasing medium for directing one of said differently polarized components along a first path and another of said differently polarized components along a second path spaced from said first path, and
   reflecting end mirrors disposed in said first and second paths for reflecting said differently polarized components back along said first and second paths to said first-named reflecting end mirror.

2. Apparatus for producing from a common active lasing source a plurality of light beams having different characteristics comprising
   an active lasing medium for producing light that has plane polarized components that are orthogonal with respect to each other,
   a reflecting end mirror disposed at one end of said active lasing medium,
   means disposed at the opopsite end of said active lasing medium for directing one of said orthogonal components along a first path and the other of said orthogonal components along a second path spaced from said first path, and
   reflecting end mirrors disposed in said first and second paths for reflecting the respective orthogonal components back along said first and second paths to said first-named reflecting end mirror.

3. Lasing apparatus having a plurality of light cavities that share a common active lasing material comprising,
   an active lasing material for producing coherent light that has plane polarized components that are orthogonal with respect to each other,
   a reflecting end mirror disposed at one end of said material,
   beam splitting means disposed at the opposite end of said material for separating said orthogonal components in accordance with their polarization into respective paths that are angularly displaced with respect to each other, and
   second and third end mirrors disposed in each of said paths for reflecting the respective orthogonal components along the respective paths toward said beam splitting means.

4. Lasing apparatus having a plurality of light cavities that share a common active lasing material comprising,
   an active lasing material for producing coherent light that has plane polarized components that are orthogonal with respect to each other,
   a reflecting end mirror disposed at one end of said material,
   beam splitting means disposed at the opposite end of said material for separating said orthogonal components in accordance with their polarization into respective paths that are angularly displaced with respect to each other,
   at least one of said paths including means for changing the characteristics of the light propagating along only that one path, and
   second and third end mirrors disposed in each of said paths for reflecting the respective orthogonal components along the respective paths toward said beam splitting means.

5. Lasing apparatus having a plurality of light cavities that share a common active lasing material comprising
   an active lasing material for producing coherent light that has plane polarized components that are orthogonal with respect to each other,
   a reflecting end mirror disposed at one end of said material,
   beam splitting means disposed at the opposite end of said material for separating said orthogonal components in accordance with their polarization into respective paths that are angularly displaced with respect to each other,
   at least one of said paths including means for changing the frequency of the light propagating along said path, and
   second and third end mirrors disposed in each of said paths for reflecting the respective orthogonal components along the respective paths toward said beam splitting means.

References Cited

UNITED STATES PATENTS 3,402,365  9/1968  Uchida _____ 331—94.5

RONALD L. WIBERT, Primary Examiner

U.S. Cl. X.R.

350—150, 160